United States Patent
Perry et al.

(10) Patent No.: US 11,064,247 B1
(45) Date of Patent: Jul. 13, 2021

(54) SYSTEM AND METHOD FOR COMMUNICATING NON-STANDARD VIDEO DATA VIA USB

(71) Applicant: Elo Touch Solutions, Inc., Milpitas, CA (US)

(72) Inventors: Brian Perry, Knoxville, TN (US); Asela Ekanayake, Santa Clara, CA (US); Fareed Uddin, San Jose, CA (US); Jiachi Zhang, Santa Clara, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 0 days.

(21) Appl. No.: 16/887,233

(22) Filed: May 29, 2020

(51) Int. Cl.
  *H04N 7/18* (2006.01)
  *H04N 21/4363* (2011.01)
  *H04N 21/438* (2011.01)
  *H04N 21/4545* (2011.01)
  *G06F 13/38* (2006.01)
  *H04N 21/422* (2011.01)

(52) U.S. Cl.
  CPC ..... *H04N 21/43632* (2013.01); *G06F 13/382* (2013.01); *H04N 21/42202* (2013.01); *H04N 21/4381* (2013.01); *H04N 21/4545* (2013.01); *G06F 2213/0042* (2013.01)

(58) Field of Classification Search
  None
  See application file for complete search history.

(56) References Cited

U.S. PATENT DOCUMENTS

| | | | | |
|---|---|---|---|---|
| 5,532,742 A | * | 7/1996 | Kusaka | H04N 9/0455 348/264 |
| 2006/0176262 A1 | * | 8/2006 | Fujine | G09G 3/3611 345/98 |
| 2009/0256968 A1 | * | 10/2009 | Matsunaka | H04N 5/46 348/598 |
| 2013/0265945 A1 | * | 10/2013 | He | H04L 5/0051 370/329 |
| 2014/0047253 A1 | * | 2/2014 | Kim | G06F 16/40 713/320 |
| 2020/0019528 A1 | * | 1/2020 | Sun | H04N 21/443 |

* cited by examiner

*Primary Examiner* — William J Kim
(74) *Attorney, Agent, or Firm* — Sterne, Kessler, Goldstein & Fox P.L.L.C.

(57) ABSTRACT

Some embodiments include an apparatus, method, and computer program product for receiving non-standard video data via a single standard universal serial bus (USB) interface, where the non-standard video data includes sensor data from one or more sensors in addition to standard video frames from an image detector. Some embodiments include recovering a standard video picture encoding packet from a standard USB packet, and recovering non-standard video data. Some embodiments include detecting a pseudo-video frame within the non-standard video data, determining sensor data from one or more sensors from the pseudo-video frame, and transmitting the sensor data to a monitor scaler processor. Some embodiments include storing the standard USB packet, and in response to the detecting, discarding the pseudo-video frame.

20 Claims, 7 Drawing Sheets

SYSTEM AND METHOD FOR COMMUNICATING NON-STANDARD VIDEO DATA VIA USB

BACKGROUND

Field

The present disclosure relates generally to transmitting video data, and non-standard video data in particular, over a standard universal serial bus (USB) connector.

Background Art

Devices using universal serial bus (USB) connectors are limited by the USB protocol and the number of pins available on the USB connector. Some connectors have an extra pin, some times called a "trigger pin" that can be used to communicate one type of data via that trigger pin.

SUMMARY

Some embodiments include a system, method, combination, sub-combination and other embodiments for transmitting non-standard video data over a single standard universal serial bus (USB) connector. Some embodiments include a webcam that includes a transceiver and a processor coupled to the transceiver. The processor can receive standard video frames from an image detector and sensor data from one or more sensors. The one or more sensors can include: an ambient light sensor, a proximity sensor, a motion sensor, a microphone, or a people counter sensor. In response to the determination, the processor can determine a pseudo-video frame that corresponds to the sensor data, and generate non-standard video data corresponding to the pseudo-video frame and the video frames. The pseudo-video frame enables one or more different types of sensor data to be added to the video frames and yet utilize standard video picture encoding protocols and standard USB protocols. Using standard protocols results in a cost saving solution compared to utilizing custom protocols.

In some embodiments, the processor can encode the non-standard video data to a standard video picture encoding packet, encode the standard video picture encoding packet to a standard universal service bus (USB) packet, and transmit the standard USB packet via a single standard USB interface to a display system such as a touchscreen display and/or a host computer.

To generate the non-standard video data, the processor can add the pseudo-video frame to the received video frames, or replace an original video frame of the received standard video frames with the pseudo-video frame. For example, information can be added to an original video frame to create a pseudo-video frame, and the pseudo-video frame can be reinserted to the stream of received standard video frames. To determine the pseudo-video frame, the processor can encode the sensor data to: a pattern on a video frame, a color on a video frame, an audio portion of a video frame, or a watermark added to a video frame.

The standard video picture encoding packet can be based on: MPEG-4 Part 2 protocol, YUY2 protocol, or H.264 protocol. When the standard video picture encoding packet is an MPEG-4 Part 2 packet, to encode the non-standard video data to the MPEG-4 Part 2 packet, the processor can include the non-standard video data in a data field of the MPEG-4 Part 2 packet. To include the non-standard video data in the data portion of the MPEG-4 Part 2 packet, the processor can create a quasi header field comprising the pseudo-video frame, and create a quasi data field comprising the received video frames, wherein the quasi header field and the quasi data field are carried within the data field of the MPEG-4 Part 2 packet.

Some embodiments include an apparatus, for receiving non-standard video data via a single standard USB interface. The apparatus can be for example, a display system coupled to a host computer. In some embodiments a display system includes a transceiver, and a processor coupled to the transceiver that can receive a standard USB packet via a single standard USB interface. The processor can recover a standard video picture encoding packet from the standard USB packet, recover non-standard video data from the standard video picture encoding packet, and detect a pseudo-video frame within the non-standard video data. The processor can determine from the pseudo-video frame, sensor data from one or more sensors, and transmit the sensor data to a monitor scaler processor that adjusts characteristics of the display system accordingly. The sensor data includes one or more of: ambient light sensor data, proximity sensor data, motion sensor data, audio data, or a people counter sensor data.

Some embodiments include a gated buffer coupled to the processor, where the gated buffer is configured to store the standard USB packet. The processor can in response to the detection, transmit a discard flag to the gated buffer to remove a pseudo-video frame from the non-standard video data in the standard USB packet so that standard video frames remain, and transmit the standard video frames to a host processor.

To determine from the pseudo-video frame, sensor data from the one or more sensors, the processor can decode the sensor data from: a pattern of the pseudo-video frame, a color of the pseudo-video frame, an audio portion of the pseudo-video frame, or a watermark added to the pseudo-video frame. The standard video picture encoding packet can be based on: MPEG-4 Part 2 protocol, YUY2 protocol, or H.264 protocol. When the standard video picture encoding packet is an MPEG-4 Part 2 packet, to recover the non-standard video data from the MPEG-4 Part 2 packet, the processor can decode the non-standard video data from a data field of the MPEG-4 Part 2 packet. To decode the non-standard video data from the data field of the MPEG-4 Part 2 packet, the processor can decode a quasi header field comprising the pseudo-video frame, and decode a quasi data field comprising the video frames, where the quasi header field and the quasi data field are within the data field of the MPEG-4 Part 2 packet.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Devices utilizing a universal serial bus (USB) connector are limited by the USB protocol and the number of pins available on the USB connector. Some USB connectors have an extra pin, a "trigger pin" that enables only one type of data to be communicated. But, if there is a need to send more than one type of data or multiple "triggers," additional USB connectors or different connectors must be used. Some embodiments enable communication of two or more types of data or multiple "triggers" via a single USB connector or USB interface, and enable the use of standard video picture encoding protocols that are lower in cost compared to custom video picture encoding protocols, for example.

Figure 1:
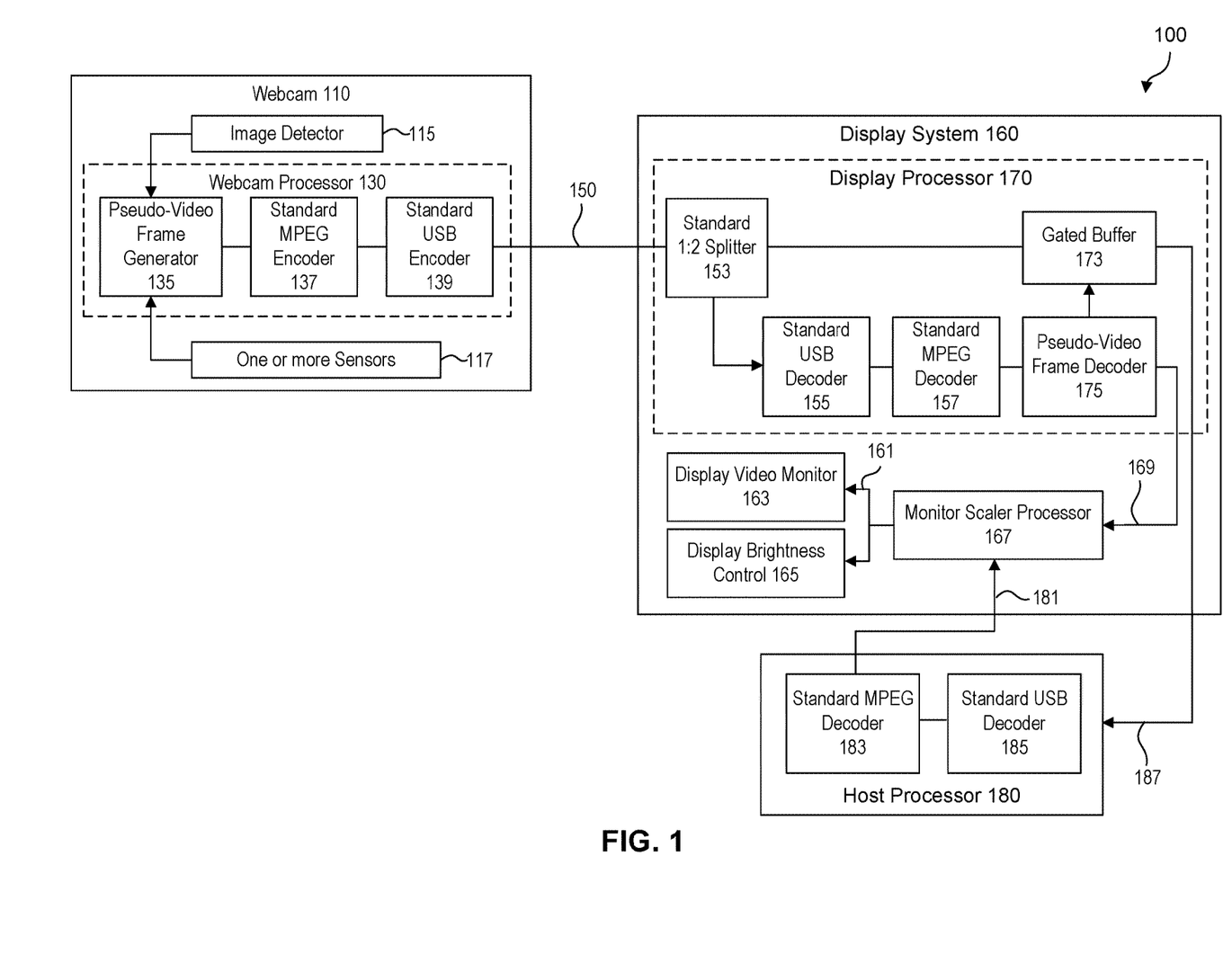
FIG. 1 illustrates an example system for communicating non-standard video data via universal serial bus (USB), according to an exemplary embodiment of the disclosure.

FIG. 1 illustrates an example system 100 for communicating non-standard video data via USB, according to an exemplary embodiment of the disclosure. System 100 includes webcam 110 coupled to display system 160 via single USB interface 150. Single standard USB interface 150 can be a USB cable that includes a standard USB connector at webcam 110 and a standard USB connector at display system 160. Display system 160 can be a touch/display, such as a projected capacitive (PCAP) touchscreen in combination with an LCD display, that can be coupled to host processor 180 via standard USB interface 187. The touchscreen of the touch/display may be any type of touchscreen such as infra-red, SAW or resistive as well as PCAP and the display may be any type of display such as plasma or OLED (organic light emitting diode) as well as LCD. Host processor 180 can include a standard video picture encoding protocol decoder such as standard MPEG decoder 183 and standard USB decoder 185.

Webcam 110 includes image detector 115 that captures video and transmits video frames to webcam processor 130. Webcam processor 130 can be one or more processors. Webcam processor 130 can be coupled to one or more sensors 117. Webcam processor comprises pseudo-video frame generator 135, standard MPEG encoder 137, and standard USB encoder 139. When sensor data is received from one or more sensors 117, pseudo-video frame generator 135 can determine corresponding pseudo-video frames, and generate non-standard video data that correspond to the pseudo-video frames and video frames received from image detector 115. The frequency in which pseudo-video frame generator 135 receives the sensor data from one or more sensors 117 and/or generates pseudo-video frames is configurable. In some embodiments pseudo-video frame generator 135 generates pseudo-video frames periodically, once until a significant change is detected where the significant change is based on settable threshold values being satisfied, and/or according to a configurable schedule, or a combination of the above.

The non-standard video data can be encoded to a standard video picture encoding packet. For example, standard MPEG encoder 137 can encode the non-standard video data into an MPEG packet(s) and standard USB encoder 139 can encode the MPEG packet(s) into a standard USB packet(s) to be transmitted over a single standard USB interface 150.

Display system 160 includes display processor 170, monitor scaler processor 167, display video monitor 163, and display brightness control 165. Display processor 170 includes standard 1:2 splitter 153, standard USB decoder 155, standard video picture decoder such as standard MPEG decoder 157, pseudo-video frame decoder 175, and an optional gated buffer 173. Display processor 170 can receive the standard USB packet(s) via single standard USB interface 150, and copies are transmitted to gated buffer 173 and standard USB decoder 155. Standard USB decoder 155 recovers a video picture encoding packet(s) such as an MPEG packet(s) from the standard USB packet(s) and Standard MPEG decoder 157 can recover the non-standard video data from video data from MPEG packet(s). Pseudo-video frame decoder 175 can detect the pseudo-video frame(s) from the non-standard video data. In some embodiments pseudo-video frame decoder 175 decodes pseudo-video frames periodically, once until a significant change is detected where the significant change is based on settable threshold values being satisfied, and/or according to a configurable schedule, or a combination of the above.

For example, pseudo-video frame decoder can determine the sensor data from one or more sensors 117, interpret the meaning of the sensor data, and transmit the sensor data to monitor scaler processor 167 via a general purpose input/output (GPIO) interface 169. For example, in response to receiving the sensor data, the monitor scaler processor 167 can transmit instructions via low voltage differential signal (LVDS) 161 to display brightness control 165 so that the output of display system 160 is adjusted based on the sensor data. For example, if ambient lighting is reduced in the evening, it may be detected by the one or more sensors 117 with the end result that the brightness of display video monitor 163 is reduced to appear less glaring.

In addition, pseudo-video frame decoder 175 can inform gated buffer 173 (e.g., transmit a discard flag to gated buffer 173) to discard the latest USB packet(s) received from splitter 153 when the USB packet(s) contain a pseudo-video frame. Or pseudo-video frame decoder 175 can inform gated buffer 173 to release the latest USB packet(s) received from splitter 153 when the USB packet(s) contain standard video data. The standard video frames are transmitted to host processor 180 via standard USB interface 187. Host processor 180 can use standard USB decoder 185 to decode the USB packet(s) to recover video picture encoding packet(s) such as MPEP packet(s), and recover standard video frames using standard MPEG decoder 183. The recovered standard video frames can be transmitted over an audio/video interface such as high-definition multimedia interface (HDMI) interface 181 to monitor scalar processor 167. Monitor scalar processor 167 transmits the video frames via LVDS 161 to display video monitor 163 where the video frames are presented for viewing.

Figure 7:
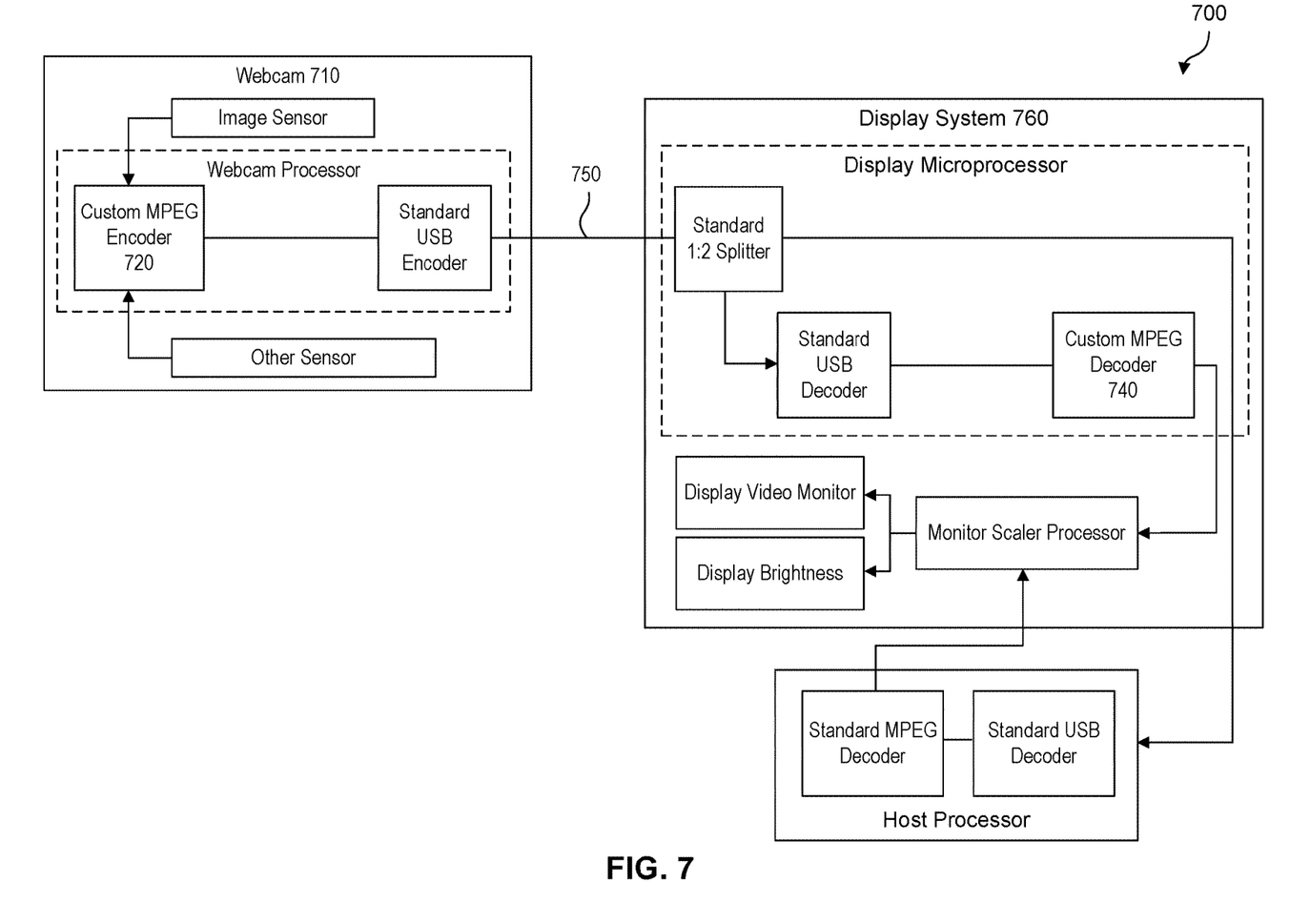
FIG. 7 illustrates an example system for communicating video data via universal serial bus (USB), according to an exemplary embodiment of the disclosure.

FIG. 7 illustrates an example system 700 for communicating video data via universal serial bus (USB), according to an exemplary embodiment of the disclosure. System 700 includes webcam 710 that transmits via standard USB interface 750 to display system 760. Instead of utilizing a standard video picture encoding protocol like system 100, system 700 utilizes custom encoders and custom decoder such as custom MPEG encoder 720 and custom MPEG decoder 740. Using these custom encoders and decoders are more costly compared to using standard video picture encoding protocols. System 100 demonstrates some embodiments to avoid the costs associated with the custom encoders and custom decoders.

Figure 2:
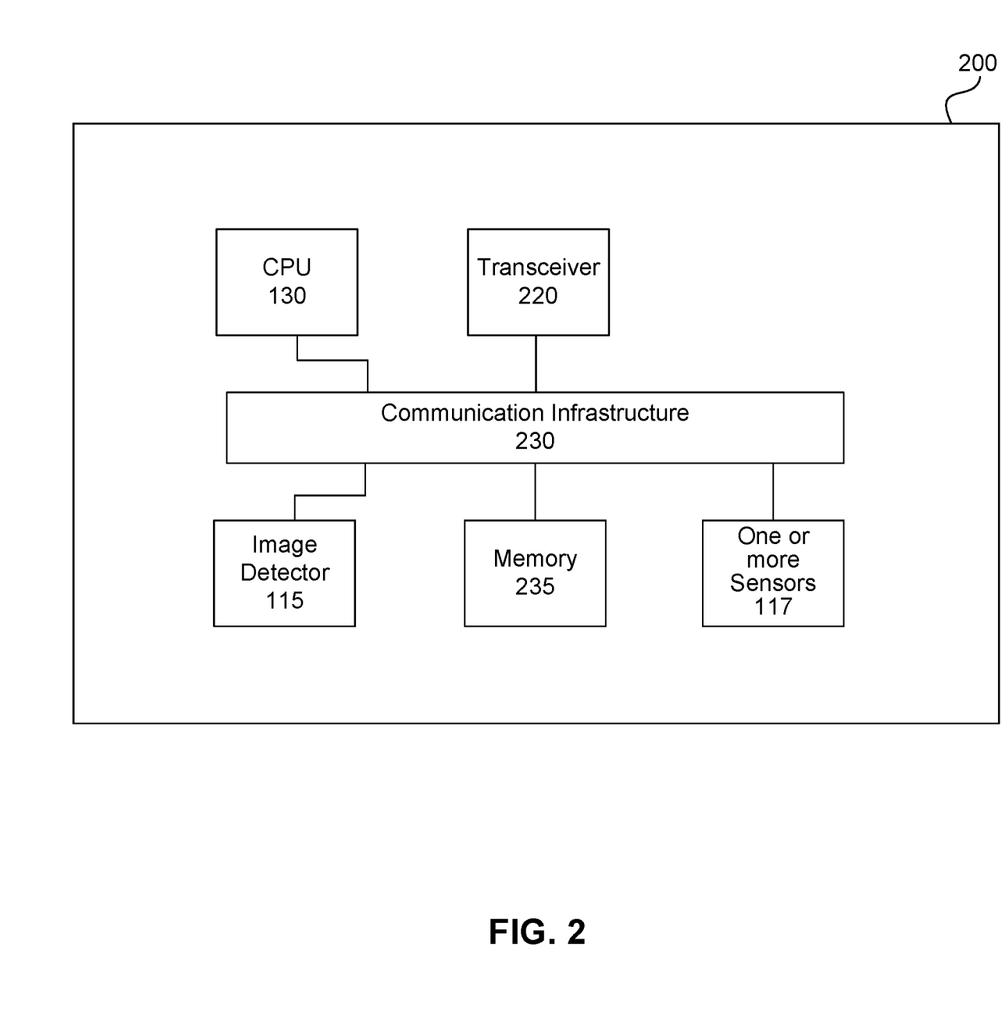
FIG. 2 illustrates an example webcam system, according to an exemplary embodiment of the disclosure.

FIG. 2 illustrates an example webcam system 200, according to an exemplary embodiment of the disclosure. For explanation purposes, and not a limitation, FIG. 2 may be described with elements from previous figures. System 200 includes central processing unit (CPU) 130 which is substantially webcam processor 130 that can be one or more processors or microprocessors. System 200 also includes transceiver 220, communication infrastructure 230, memory 235, image detector 115 and one or more sensors 117. Image detector 115 can be included in a camera chip, for example. Memory 235 may include random access memory (RAM) and/or cache, and may include control logic (e.g., computer instructions) and/or data. CPU 210 together with the instructions stored in memory 235 performs operations enabling the webcam system 200 to communicate non-standard video data via a single USB interface. Transceiver 220 transmits and receives video communications signals via a single USB interface 150. USB interface 150 can include but is not limited to USB 2.0, 3.0, A, B, or mini-USB. Communication infrastructure 230 may be a bus. For example, CPU 130 can receive standard video frames from image detector 115 and sensor data from one or more sensors 117 via communication infrastructure 230. CU 130 can determine one or more pseudo-video frame(s) that correspond to respective sensor and generate non-standard video data accordingly. Webcam 110 can be coupled to display system 160 coupled to host processor 180.

One or more sensors 117 can include but are not limited to: an ambient light sensor, a proximity sensor, a motion sensor, a microphone, or a people counter sensor. In some embodiments, having the ability to include one or more sensors in addition to the standard video stream from image detector 115, hence two or more types of data on a single standard USB connector or single standard USB interface, increases flexibility and avoids the cost of using custom video picture encoding protocols and custom video picture encoding packets. Including one or more types of sensor data with received video frames (e.g., from image detector 115) can be considered non-standard video data.

An ambient light sensor can detect changes in the lighting where system 200 resides. For example, system 200 may be in a room with a window. When the sun sets in the evening, the ambient light sensor can detect that the lighting has been reduced and transmit sensor data to CPU 130 indicating as much. When that sensor data is eventually received by monitor scaler processor 167 from display processor 170, for example, monitor scaler processor 167 can transmit instructions via LVDS 161 to display brightness control 165 to reduce brightness, for example. In some embodiments, sensor data from an ambient light sensor may also affect colors on display video monitor 163, for example.

A motion sensor can determine a presence. When system 200 (e.g., webcam 110) determines a presence via a motion sensor, system 200 can inform display system 160 and/or host processor 180 so that a shift from power-saving mode to active mode occurs or vice versa if no presence is detected after a given time (e.g., transition from active mode to power-saving mode.) When a user is not detected, system 200 informs display system 160 and/or host processor 180 and display system 160 in conjunction with host processor 180 can display advertisements (e.g., real estate for sale) without menus. When a user is detected (e.g., motion detected), the sensor data from the proximity sensor can be transmitted to display system 160. In some embodiments, the sensor data corresponding to the motion sensor may be transmitted from display system 160 to host processor 180 so that the information displayed on display system 160 can change to for example, include menus, reset and/or activate touch buttons, or present information that may invite or attract a user to interact with display system 160. A proximity sensor can determine how close a user is to system 200 (e.g., webcam 110.) Thus, a proximity sensor can indicate the presence of a user near display system 160 (e.g., a touchscreen) and host processor 180 (e.g., a host computer system.) The proximity sensor can provide information regarding the proximity distance and update that information at different times as a user is moving closer or moving away (e.g., a potential user is 6 feet away, 3 feet away, 6 inches away from webcam 110 (and/or display system 160 and host processor 180.) This allows host processor (e.g., applications running on the host computer system) to adjust presentations on display system 160 accordingly.

One or more sensors 117 can also include an audio sensor such as a microphone that can receive sounds in proximity to system 200. For example, when the microphone determines ambient noise, that sensor data can be transmitted to display system 160 and monitor scalar processor 167 resulting in an increased audio output or even noise cancellation processes to improve a user's experience with display system 160. A people counter sensor coupled to webcam processor 130 can enable detection of the number of people present. For example, when sensor data is transmitted that informs display processor 170 and monitor scalar processor and/or host processor 180 of a number of people present (e.g. 2 groups of people), the application running on host processor 180 and presented on display system 160 may include two separate menu screens. And each of those menu screens may include a different number of active selection buttons based on the number of people determined in each of the groups, for example. In some embodiments, the people counter sensor may work in conjunction with video frames received from image detector 115 to assess the number of people present.

Figure 3:
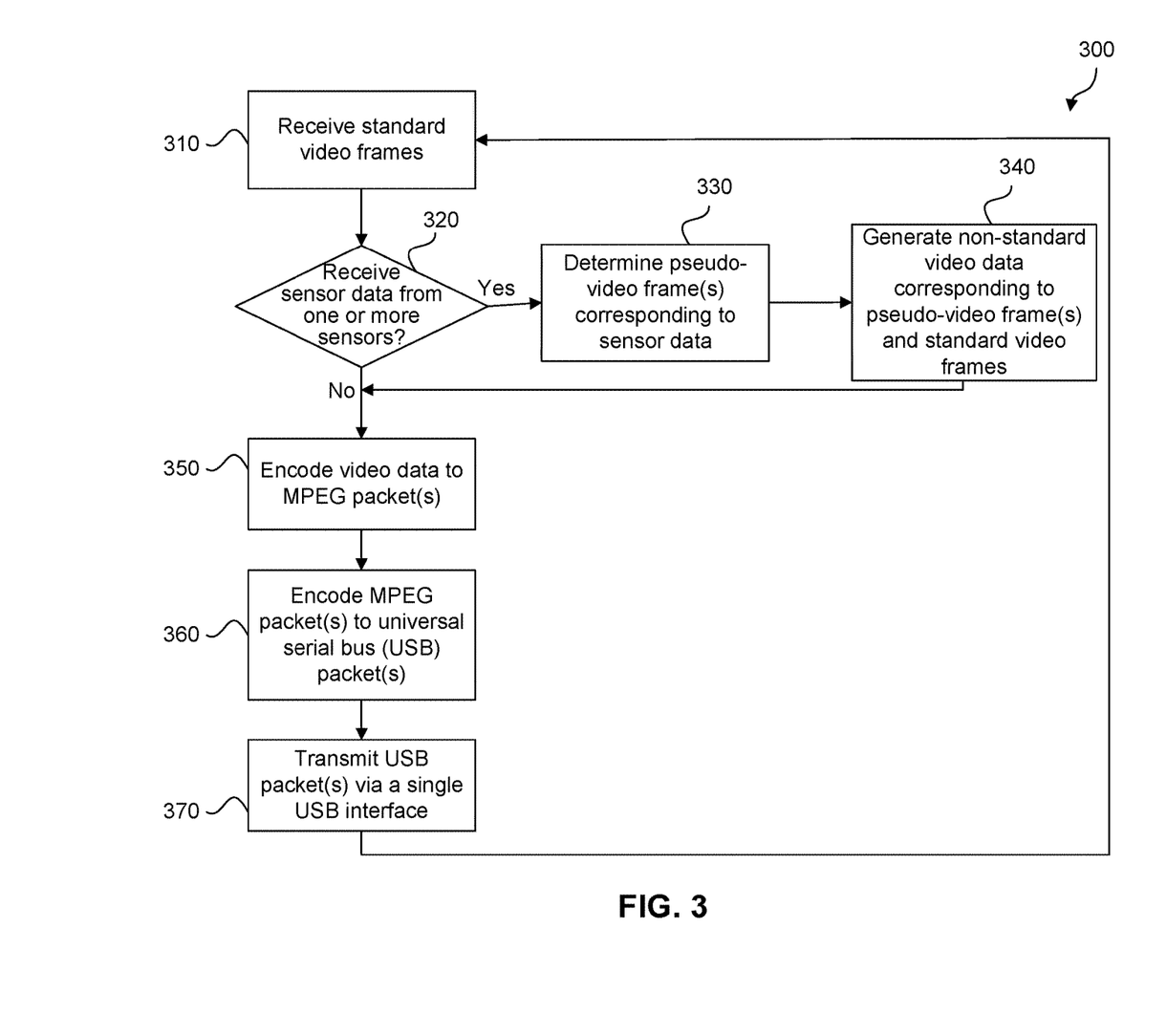
FIG. 3 illustrates an example method for transmitting non-standard video data via USB, according to an exemplary embodiment of the disclosure.

FIG. 3 illustrates an example method 300 for transmitting non-standard video data via USB, according to an exemplary embodiment of the disclosure. For explanation purposes, and not a limitation, FIG. 3 may be described with elements from previous figures. For example, method 300 can be performed by webcam processor 130, CPU 130, or system 200.

At 310, system 200 receives video frames from image detector 115 and/or sensor data from one or more sensors 117.

At 320, system 200 determines whether sensor data from one or more sensors 117 has been received. When sensor data has been received, method 300 proceeds to 330. Otherwise, method 300 proceeds to 350.

At 330, system 200 determines one or more pseudo-video frame(s) corresponding to the sensor data received. To determine the pseudo-video frame, system 200 can encode the sensor data to: a pattern on a video frame (e.g., a checker pattern such as a black and white checker video frame); a color on a video frame (e.g., a monochrome video frame such as all red; an audio portion of a video frame (e.g., using an audio packet protocol designed for transmission of data from an audio sensor including but not limited to a microphone to transport the sensor data); or a watermark added to a video frame. In some embodiments, the watermark can be visible and noticeable (e.g., in human readable format) diagnostic aid such that a technician can view the pseudo-video frame(s). As an example, the watermark may indicate "Ambient light sensor=100, increase display brightness to maximum value" and a technician can manually adjust display brightness control 165. In some embodiments signaling corresponding to the watermark sensor data is also transmitted to host processor 180 such that the pseudo-video frame that includes the watermark is held or frozen for a given time to enable the technician to read the watermark.

In some embodiments pseudo-video frame data includes an integer number of pixels of a video frame or a settable number of bits of a video frame that are transmitted in a quasi header field while the video frames received from image detector 115 are transmitted in a quasi data field. Both the quasi header field and the quasi data field can be included in a data field of a video picture encoding packet.

At 340, system 200 generates non-standard video data corresponding to pseudo-video frame(s) and the video frames received from image detector 115. To generate the non-standard video data, system 200 can add the pseudo-video frame to the received video frames (e.g., add a $31^{st}$ video frame to a stream of 30 video frames); or replace a video frame of the received video frames with the pseudo-video frame (e.g., add a marker or code to the $30^{th}$ video frame of the received video frames and return the marked $30^{th}$ video frame to the stream of received video frames.)

At 350, system 200 can encode video data to one or more standard video picture encoding packet(s) based on a standard protocol including but not limited to an MPEG-4 Part 2, YUY2, or H.264 protocol. Utilizing standard protocols avoids the costs associated with custom implementations such as custom MPEG implementations.

Figure 5:
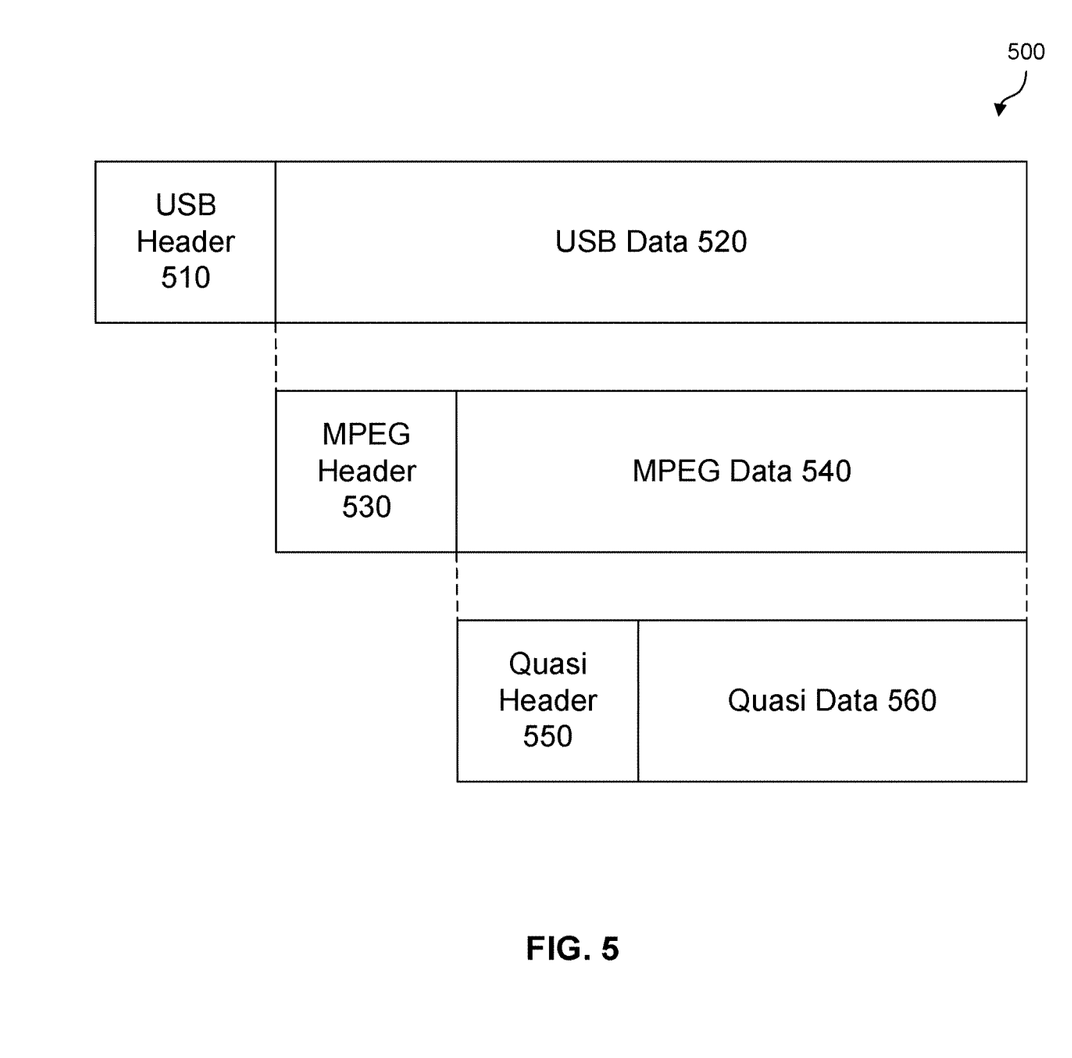
FIG. 5 illustrates example packet formats for transmitting non-standard video data, according to an exemplary embodiment of the disclosure.

FIG. 5 illustrates example packet format 500 for transmitting non-standard video data, according to an exemplary embodiment of the disclosure. For explanation purposes, and not a limitation, FIG. 5 may be described with elements from previous figures. Packet format 500 illustrates a USB packet that includes USB header field 510 and USB data field 520. A standard video picture encoding packet can be carried within USB data field 520. For example, for a MPEG-4 Part 2 packet, MPEG header field 530 and MPEG data field 540 can be carried within USB data field 520. In addition, quasi header field 550 and quasi data field 560 can be carried in a data portion of a standard video encoding packet (e.g., MPEG data field 540.) This model can be expanded to include one or more USB data packets and/or one or more video picture encoding packets.

In this example, to encode the non-standard video data to one or more standard the MPEG-4 Part 2 packets, system 200 can include the non-standard video data in a data portion of the MPEG-4 Part 2 packet (e.g., MPEG data field 540.) For example, the non-standard video data that includes pseudo-video frames based on a pattern on a video frame, a color on a video frame, an audio portion of a video frame, or a watermark added to a video frame can be transmitted in MPEG data field 540.

When the pseudo-video frame, includes an integer number of pixels of a video frame or a settable number of bits of a video frame that convey sensor data from one or more sensors 117, quasi header field 550 can carry the pseudo-video frame. In contrast, the standard video frames received from image detector 115 are not pseudo-video frames, and can be transmitted in MPEG data field 540, which for standard video frames are not divided into a quasi-header 550 and quasi data field 560. When the standard video picture encoding protocol is MPEG-4 Part 2, the quasi header and the quasi data portion are carried within the data field of the MPEG-4 Part 2 packet (e.g., MPEG data field 540.)

If sensor data was not received in 320 above, system 200 can encode the received video frames to one or more standard video picture encoding packets (e.g., a data portion of one or more MPEG-4 Part 2 packets.)

At 360, system 200 can encode the one or more MPEG packets to one or more USB packets.

At 370, system 200 can transmit the one or more USB packets via a single USB interface (e.g., via a single USB connector) to for example, display system 160.

Figure 4:
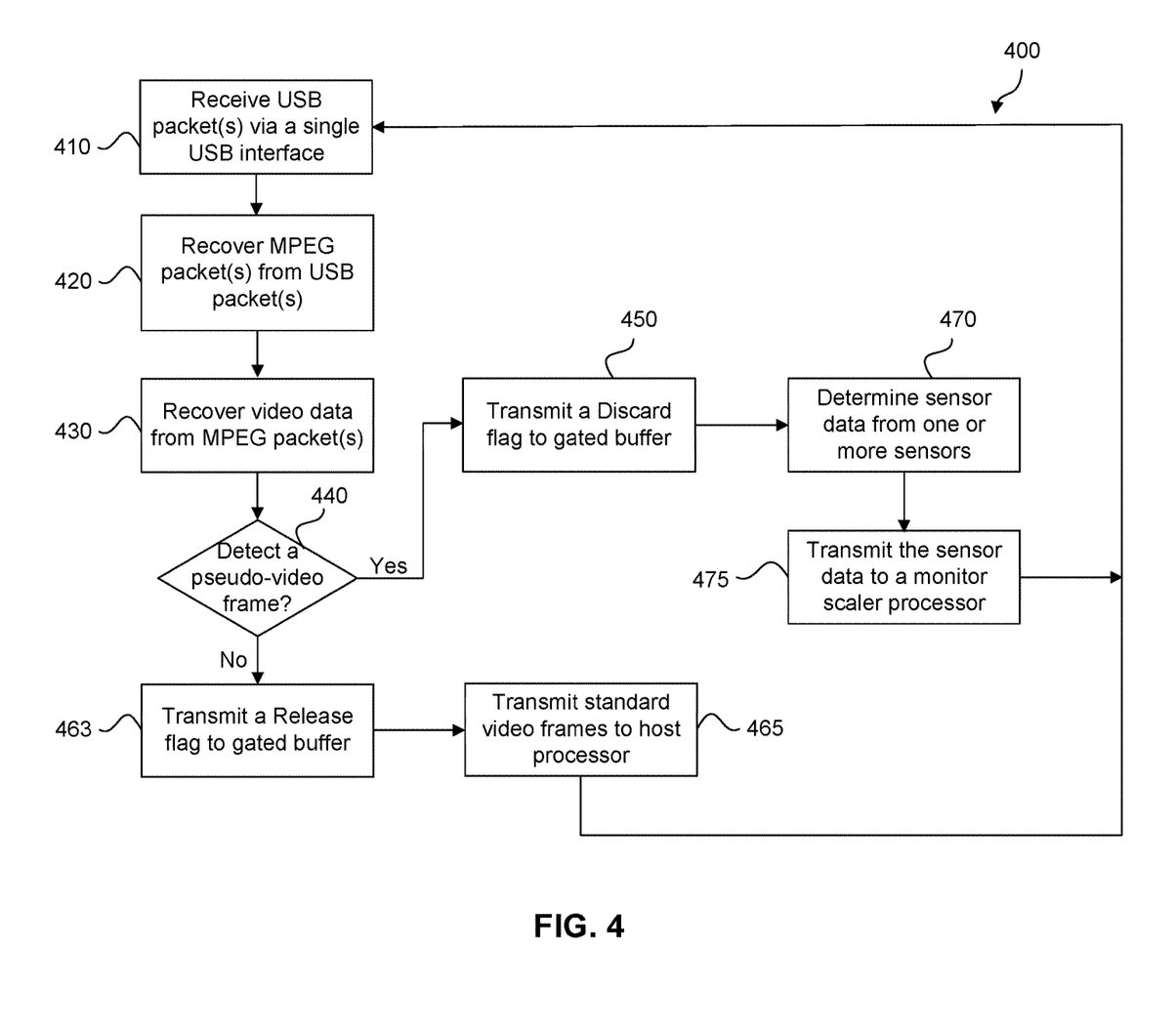
FIG. 4 illustrates an example method for receiving non-standard video data via USB, according to an exemplary embodiment of the disclosure.

FIG. 4 illustrates an example method 400 for receiving non-standard video data via USB, according to an exemplary embodiment of the disclosure. For explanation purposes, and not a limitation, FIG. 4 may be described with elements from previous figures. For example, method 400 can be performed by display processor 170, processor 604 of FIG. 6 below, and/or one or more processors.

At 410, display processor 170 receives one or more USB packets via standard single USB interface 150. For example, the one or more USB packets can be received from webcam 110 via standard 1:2 splitter 153 that transmits a first copy of the USB packets to gated buffer 173 and transmits a second copy to standard USB decoder 155.

At 420, display processor 170 recovers one or more standard video picture encoding packets from the one or more USB packets. For example, display processor 170 can utilize standard USB decoder 155 to recover the one or more standard video picture encoding packets.

At 430, display processor 170 recover (e.g., decode) video data from the one or more standard video picture encoding packets. The video data can include video frames received from image detector 115 (e.g., when one or more sensors 117 do not provide sensor data), or non-standard video data that includes pseudo-video frames as described above. The standard video picture encoding packet(s) can be based on protocols including but not limited to an MPEG-4 Part 2, YUY2, or H.264 protocol. Utilizing standard protocols avoids the costs associated with custom implementations such as custom MPEG implementations. In this example, to recover the video data (e.g., decode) the non-standard video data or video frames from standard MPEG-4 Part 2 packets, display processor 170 can use standard MPEG decoder 157 to recover video data from a data portion of the MPEG-4 Part 2 packet (e.g., MPEG data field 540.) In some embodiments, to decode the non-standard video data from the data portion of the MPEG-4 Part 2 packet, display processor 170 can decode a quasi header field comprising the pseudo-video frame, and decode a quasi data field comprising the video frames, where the quasi header and the quasi data portion are within the data portion of the MPEG-4 Part 2 packet.

At 440, display processor 170 detects whether the video data recovered includes a pseudo-video frame. When a pseudo-video frame is detected, method 400 proceeds to 450. Otherwise, method 400 proceeds to 463. To detect a pseudo-video frame, display processor 170 can detect an extra video frame of the standard video frames received from image detector 115 and remove the extra video frame (e.g., the pseudo-video frame); detect a replaced video frame of the standard video frames from image detector 115, and remove the pseudo-video frame content; and/or detect a pseudo-video frame within a quasi header field (e.g., quasi header field 550.)

At 450, display processor 170 transmits a discard flag to gated buffer 173 so that the pseudo-video frame within the USB packet stored is discarded so that the pseudo-video frame is not transmitted to host processor 180.

At 470, display processor 170 determines the sensor data from one or more sensors 117 by analyzing the pseudo-video frames detected at 440. For example, to determine sensor data from the one or more sensors from the pseudo-video frame, the display processor 170 can decode the sensor data from: a pattern of the pseudo-video frame, a color of a pseudo-video frame, an audio portion of a pseudo-video frame, a watermark added to a pseudo-video frame, or from a pseudo-video frame within a quasi header field.

At 475, display processor 170 can transmit the sensor data to a monitor scaler processor via a general purpose input/output (GPIO) protocol interface. The sensor data can include one or more of: ambient light sensor data, proximity sensor data, motion sensor data, audio data, or a people counter sensor data. Monitor scaler processor 167 controls display video monitor 163 and display brightness control 165. Based on the sensor data received, monitor scaler processor 167 can: adjust (e.g., increase or decrease) display brightness control 165; freeze a frame that includes a diagnostic watermark; adjust the audio (e.g., increase or decrease volume) output or adjust noise cancellation; and/or transition into power saving mode from active mode or vice versa. In some embodiments, monitor scaler processor 167 can transmit sensor data instructions to host processor 180 that relates host processor 180 applications that utilize proximity sensor data, people counter sensor data, and watermarks that may be visible (e.g., instructions to technicians.)

Returning to 463, display processor 170 transmits a release flag to gated buffer 173.

At 465, display processor 170 transmits the standard video frames to host processor 180. In some embodiments, gated buffer 173 is absent or disabled. In this case all USB packets received from webcam 110 are sent directly from splitter 153 to host processor 180 regardless of whether the packets contain true video frames of the standard video frames from image detector 115 or contain pseudo-video frames. In such embodiments, care must be taken so that transmitted pseudo-video frames to not unduly compromise display video images as perceived by users. If pseudo-video frames are transmitted infrequently enough, occasional display image glitches due to projection of pseudo-video frame data as a video image may be hardly noticed. A more robust solution is to arrange for pseudo-video frames, when projected on the display, to appear very similar to a true video frame of the standard video frames from image detector 115, such as by copying a true video frame of the standard video frames and then adding sensor data in the form of a hard to see watermarks. Yet another approach is to reproduce the functions of pseudo-video frame decoder 175 in software running in the host computer 180 (downstream of 183 and upstream of 181) so that host computer 180 may discard pseudo-video frames before they reach the display. In this example, host processor 180 can decode and interpret the pseudo-video frames and adjust the applications running on host processor 180 that are displayed on display system 160. These include the applications that utilize proximity sensor data, people counter sensor data, and watermarks that may be visible (e.g., instructions to technicians.)

Figure 6:
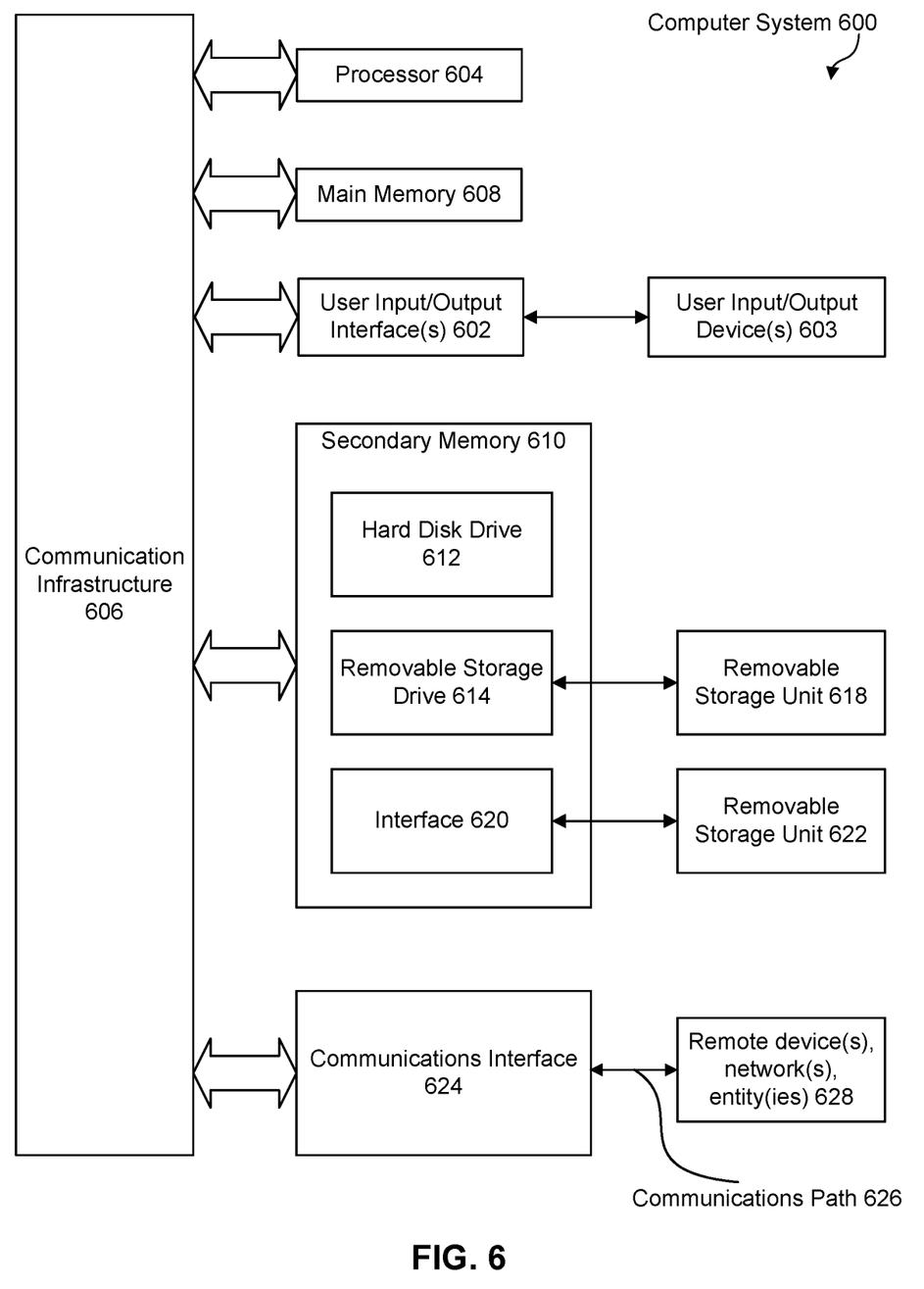
FIG. 6 illustrates an example computer system useful for implementing and/or using various embodiments.

Various embodiments can be implemented, for example, using one or more well-known computer systems, such as computer system 600 shown in FIG. 6. Computer system 600 can be any well-known computer capable of performing the functions described herein such as display system 160 and/or a host computer that includes host processor 180 of FIG. 1.

Computer system 600 includes one or more processors (also called central processing units, or CPUs), such as a processor 604. Processor 604 is connected to a communication infrastructure or bus 606. One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Computer system 600 also includes user input/output device(s) such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data. Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired, and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. An apparatus for transmitting non-standard video data, comprising:
    a transceiver; and
    one or more processors coupled to the transceiver, configured to:
        receive standard video frames;
        determine that sensor data from one or more sensors have been received;
        in response to the determination, determine a pseudo-video frame that corresponds to the sensor data;
        generate the non-standard video data corresponding to the pseudo-video frame and the standard the video frames;
        encode the non-standard video data to a standard video picture encoding packet;
        encode the standard video picture encoding packet to a standard universal service bus (USB) packet; and
        transmit the standard USB packet via a single standard USB interface.

2. The apparatus of claim 1, wherein the one or more sensors comprise: an ambient light sensor, a proximity sensor, a motion sensor, a microphone, or a people counter sensor.

3. The apparatus of claim 1, wherein to generate the non-standard video data, the one or more processors are configured to:
    add the pseudo-video frame to the standard video frames; or
    replace a video frame of the standard video frames with the pseudo-video frame.

4. The apparatus of claim 1, wherein to determine the pseudo-video frame, the one or more processors are configured to: encode the sensor data to: a pattern on a video frame, a color on a video frame, an audio portion of a video frame, or a watermark added to a video frame.

5. The apparatus of claim 1, wherein the standard video picture encoding packet is based on: MPEG-4 Part 2 protocol, YUY2 protocol, or H.264 protocol.

6. The apparatus of claim 5, wherein the standard video picture encoding packet is an MPEG-4 Part 2 packet, and to encode the non-standard video data to the MPEG-4 Part 2 packet, the one or more processors are configured to: include the non-standard video data in a data field of the MPEG-4 Part 2 packet.

7. The apparatus of claim 6, wherein to include the non-standard video data in the data field of the MPEG-4 Part 2 packet, the one or more processors are configured to:
create a quasi header field comprising the pseudo-video frame; and
create a quasi data field comprising the standard video frames, wherein the quasi header field and the quasi data field are carried within the data field of the MPEG-4 Part 2 packet.

8. An apparatus for receiving non-standard video data, comprising:
a transceiver; and
one or more processors coupled to the transceiver, configured to:
receive a standard universal serial bus (USB) packet via a single standard USB interface;
recover a standard video picture encoding packet from the standard USB packet;
recover the non-standard video data from the standard video picture encoding packet;
detect a pseudo-video frame within the non-standard video data;
determine, from the pseudo-video frame, sensor data from one or more sensors; and
transmit the sensor data to a monitor scaler processor.

9. The apparatus of claim 8, further comprising:
a gated buffer coupled to the one or more processors, wherein the gated buffer is configured to store the standard USB packet, wherein the one or more processors are further configured to: in response to the detection, transmit a discard flag to the gated buffer.

10. The apparatus of claim 8, wherein the sensor data comprises: ambient light sensor data, proximity sensor data, motion sensor data, audio data, or people counter sensor data.

11. The apparatus of claim 8, wherein to determine from the pseudo-video frame, the sensor data from the one or more sensors, the one or more processors are configured to: decode the sensor data from: a pattern of the pseudo-video frame, a color of the pseudo-video frame, an audio portion of the pseudo-video frame, or a watermark added to the pseudo-video frame.

12. The apparatus of claim 8, wherein the standard video picture encoding packet is based on: MPEG-4 Part 2 protocol, YUY2 protocol, or H.264 protocol.

13. The apparatus of claim 12, wherein the standard video picture encoding packet is an MPEG-4 Part 2 packet, and to recover the non-standard video data from the MPEG-4 Part 2 packet, the one or more processors are configured to: decode the non-standard video data from a data field of the MPEG-4 Part 2 packet.

14. The apparatus of claim 13, wherein to decode the non-standard video data from the data field of the MPEG-4 Part 2 packet, the one or more processors are configured to:
decode a quasi header field comprising the pseudo-video frame; and
decode a quasi data field comprising video frames, wherein the quasi header field and the quasi data field are within the data field of the MPEG-4 Part 2 packet.

15. A non-transitory computer-readable medium storing instructions that, when executed by a processor of a first electronic device, cause the processor to perform operations for receiving non-standard video data, the operations comprising:
receiving a standard universal serial bus (USB) packet via a single standard USB interface;
recovering a standard video picture encoding packet from the standard USB packet;
recovering the non-standard video data from the standard video picture encoding packet;
detecting a pseudo-video frame within the non-standard video data;
determining, from the pseudo-video frame, sensor data from one or more sensors; and
transmitting the sensor data to a monitor scaler processor.

16. The non-transitory computer-readable medium of claim 15, wherein the operations further comprise:
storing the standard USB packet at a gated buffer;
in response to the detecting, discard the pseudo-video frame.

17. The non-transitory computer-readable medium of claim 15, wherein the sensor data comprises: ambient light sensor data, proximity sensor data, motion sensor data, audio data, or people counter sensor data.

18. The non-transitory computer-readable medium of claim 15, wherein the determining, from the pseudo-video frame, the sensor data from the one or more sensors operation comprises: decoding the sensor data from: a pattern of the pseudo-video frame, a color of the pseudo-video frame, an audio portion of the pseudo-video frame, or a watermark added to the pseudo-video frame.

19. The non-transitory computer-readable medium of claim 15, wherein the standard video picture encoding packet is based on: MPEG-4 Part 2 protocol, YUY2 protocol, or H.264 protocol.

20. The non-transitory computer-readable medium of claim 19, wherein the standard video picture encoding packet is an MPEG-4 Part 2 packet, and the recovering the non-standard video data from the MPEG-4 Part 2 packet operation comprises: decoding the non-standard video data from a data field of the MPEG-4 Part 2 packet.

* * * * *